United States Patent

Sugawara et al.

[11] Patent Number: 4,674,357
[45] Date of Patent: Jun. 23, 1987

[54] BALANCING DEVICE FOR PRESS

[75] Inventors: Masayoshi Sugawara; Yuichi Nakamura; Akira Matsui, all of Sagamihara, Japan

[73] Assignee: Aida Engineering, Ltd., Sagamihara, Japan

[21] Appl. No.: 723,827

[22] Filed: Apr. 16, 1985

[30] Foreign Application Priority Data

Apr. 27, 1984 [JP] Japan .................... 59-85981

[51] Int. Cl.⁴ .................... G05G 1/00; G05G 3/00
[52] U.S. Cl. .................... 74/590; 74/603; 100/282
[58] Field of Search .................... 74/590, 591, 603; 100/282

[56] References Cited

U.S. PATENT DOCUMENTS

| | | | |
|---|---|---|---|
| 672,320 | 4/1901 | Ford | 74/603 |
| 3,279,266 | 10/1966 | Dobbs | 74/590 |
| 3,422,688 | 1/1969 | Bruderer | 74/590 |
| 3,611,918 | 10/1971 | Marsh et al. | 100/282 |
| 4,430,924 | 2/1984 | Dunn et al. | 74/590 |

FOREIGN PATENT DOCUMENTS 58-157597 9/1983 Japan .
58-157598 9/1983 Japan .

Primary Examiner—Albert J. Makay
Assistant Examiner—David W. Westphal
Attorney, Agent, or Firm—Holman & Stern

[57] ABSTRACT

A balancing device for a press slide arranged in a vacant space of the press frame has an eccentric ring portion 180° out of phase with an eccentric portion of the crank shaft attached to an end of the crank shaft and, a balancing weight slidable on guide posts and reciprocated vertically through a slide-block mounted in the eccentric ring.

14 Claims, 3 Drawing Figures

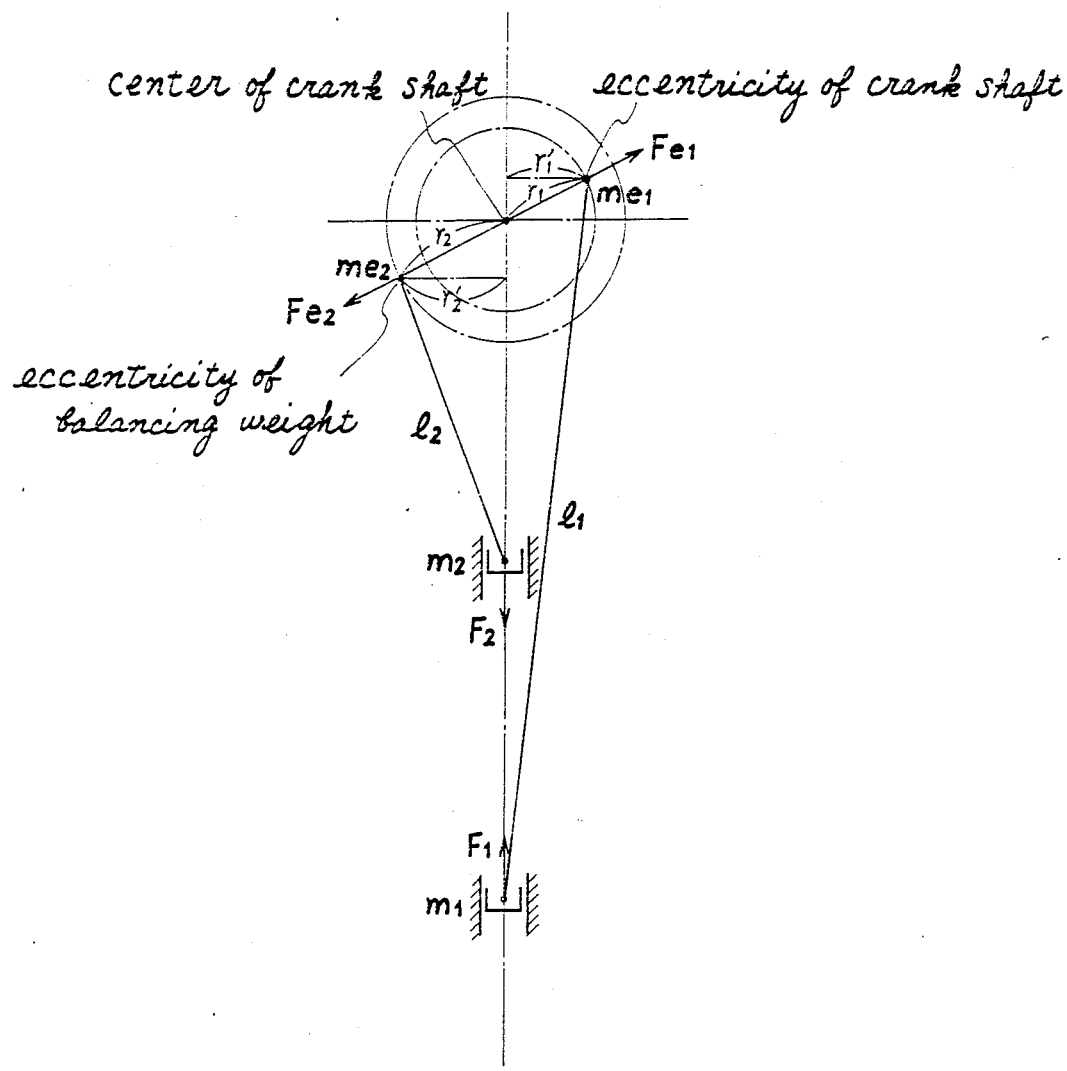

BALANCING DEVICE FOR PRESS

BACKGROUND OF THE INVENTION

1. Field of the Invention

The present invention relates to a balancing device for a press and, more particularly, to a press having a dynamic balancing-device.

2. Description of the Prior Art

A balancing device for press has heretofore been proposed of such a type that the press balance is maintained with a rotational balance of the crank shaft by attaching a balance weight in a direction opposite to an eccentric direction of the crank shaft to a gear mainly interlocking with the crank shaft.

Although Japanese Patent Applications Nos. 58-157597 and 58-157598 show one example of such a balancing device, these were of a type which merely attached the balance weight to a plurality of gears. Generally, as a press differs in its structure from an engine or the like and is a precision forming machine to drive a slide having a large mass, in the conventional mechanisms which merely attached the balance weight to a gear interlocking with the crank shaft, a complete balance could not be obtain.

However, if it is allowable to neglect a structural characteristic of the press as a commodity, a perfect balance can be obtained by arranging another balancing slide at an opposite side of the primary slide which is placed at the service of press work.

BRIEF SUMMARY OF THE INVENTION

The present invention differs in the foregoing points from the conventional art and has the object of providing an improved balancing device contrived to keep a balance of the press by attaching a balancing weight to an eccentric portion 180° out of phase from the crank eccentricity of the crank shaft.

That is, the present invention is characterized by a formation of the eccentric portion 180° out of phase with respect to the eccentricity of the crank shaft at a certain portion of said crank shaft and by an attachment of the balancing weight shackled by guide posts and movable vertically with respect to the eccentric portion.

BRIEF DESCRIPTION OF THE DRAWINGS

FIG. 3 is a schematic explanation diagram of the composition of the balancing device of the invention.

DETAILED DESCRIPTION

The present invention will now be described as for its embodiment by reference to the accompanying drawings.

Figure 1:
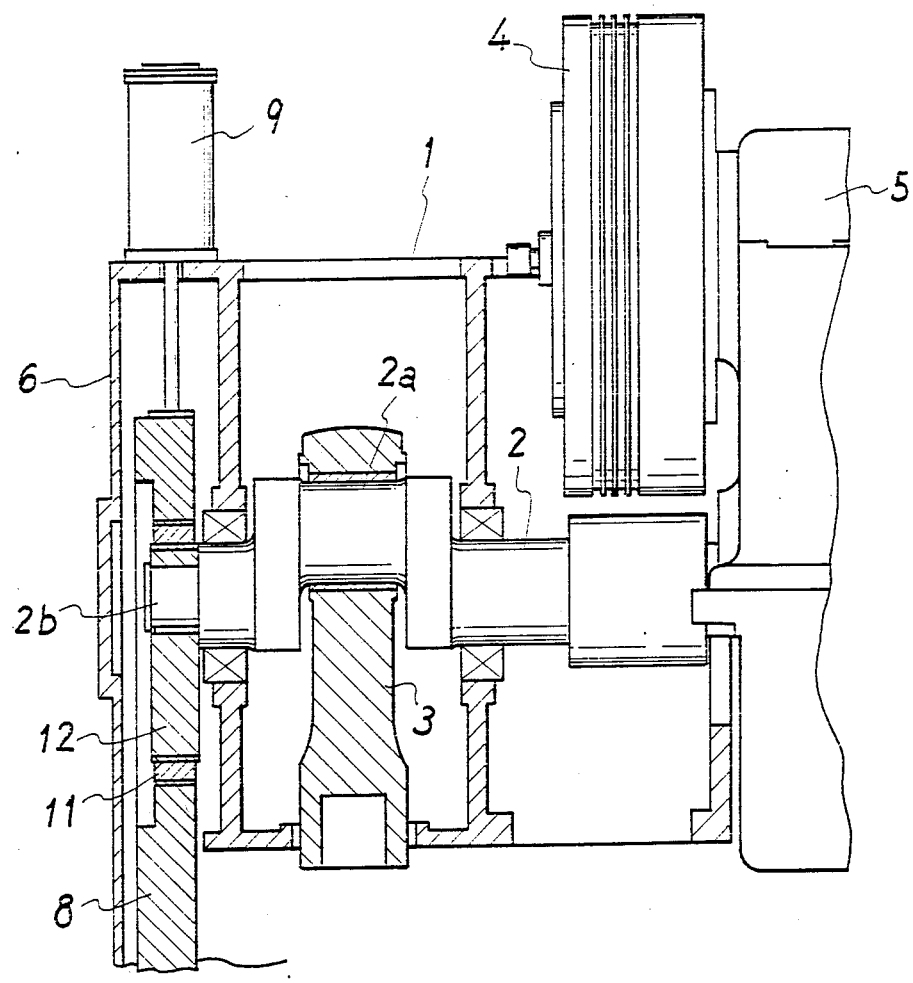
FIG. 1 is a longitudinal cross-section central front elevation view partly in a press provided with the balancing device for a press, in accordance with the invention in which a crown section and one side alone of the crank shaft having the balancing device attached thereto are illustrated.
Figure 2:
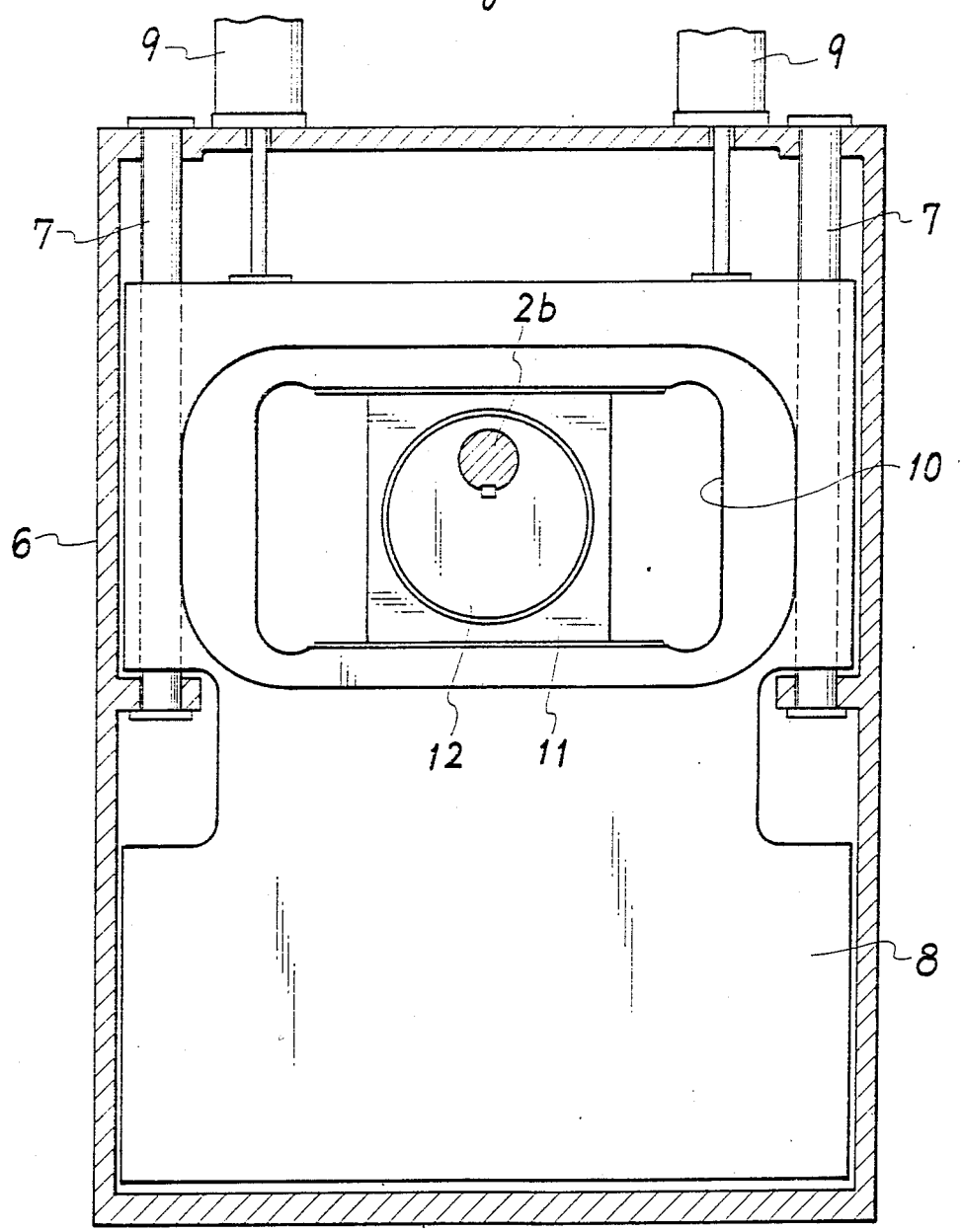
FIG. 2 is a left side elevation view of the balancing device of FIG. 1 with the wall of the housing removed.

FIG. 1 shows a left side, half longitudinally sectioned front center crown portion of the press and, FIG. 2 shows a side elevation of the balancing device. A connecting rod 3 is attached to an eccentric portion 2a of the crank shaft 2 which is supported on the crown 1 at its shaft ends and, the crank shaft 2 is interlocked with a flywheel 4 through a gear train inside a gear box 5. A slide, unillustrated, is connected to a head of said connecting rod 3. Another end of the crank shaft 2 is projected to an opposite side of the gear box 5 where another connecting rod is coupled with another eccentric portion of said crank shaft.

An end portion 2b of said crank shaft 2 is projected into a housing 6 in which the balancing device is built. The housing is provided with a balancing weight 8 which is slidable vertically by the aid of guide posts 7 and, said balancing weight 8 is designed so that it is possible to keep a balance by means of air cylinders 9 and 9 which are arranged at an upper wall of the housing 6. Further, an oblong window hole 10 is made up at an upper portion of the balancing weight 8 and a slide block 11 freely slidable in horizontal directions is supported in said window hole 10.

An eccentric ring (eccentric portion) 12 different 180° in its phase from the eccentricity of the eccentric portion 2a of the crank shaft is fitted to the shaft end 2b of said crank shaft 2 and this eccentric ring 12 is connected to the aforementioned slide block 11.

When the flywheel 4 is rotated by the press operation, the crank shaft 2 will start to run through the gear box 5 and the slide will be driven through the connecting rod 3. At the same time, the eccentric ring 12 attached to the shaft end 2b of the crank shaft 2 acts to move the slide block 11 vertically, which causes therefore the balancing weight 8 itself to move vertically along the guide posts 7 while sliding horizontally in the window hole 10 of the balancing weight 8.

In the present invention, an unbalance of the weight due to the ascending and descending movements of the slide can be compensated by the same movements of the balancing weight which produces a balanced condition because the eccentric portion 2a of the crank shaft 2 differs 180° in its phase from the eccentric ring 12.

Incidentally, there may be some cases where the balancing weight is made smaller due to the conditions of space of the housing 6 and other reasons, however, according to the present invention, even in such cases, the slide's weight unbalance can be compensated in part equivalent to a mass of the balancing weight employed in said press.

FIG. 3 is a schematic explanation diagram of the present balancing device to make it easier to understand the principle of operation and, each mark in said diagram denotes:

$m_1$: Mass of the slide $r_1$: Eccentricity of the crank shaft $l_1$: Length of the connecting rod $me_1$: Unbalance mass resulting from eccentricity of the crank shaft, and $m_2$: Mass of the balancing weight $r_2$: Eccentricity of the drive ring of the balancing weight $l_2$: Length of the connecting rod of the balancing weight portion (However, as the balancing device of the invention does not have a corresponding connecting rod it is conceivable that the value of $l_2$ is infinite)

$me_2$: Unbalance mass in eccentric portion of the balancing weight (1) In order to bring a relationship of the balance between slide mass and balancing weight to a state of $F_1 = F_2$, the requirements of $m_1 r'_1 = m_2 r'_2$ must be satisfied. However, in the invention, as a corresponding connnecting rod for the balance weight is not provided, it is necessary to add the mass of the connnecting rod for the slide to the mass of the slide itself into consideration as a value of $m_1$.

(2) To bring a proportional relationship of the rotational balance at the center of the crank shaft to a state of $Fe_1=Fe_2$, the requirements of $m_e{}_1r_1$ must be satisfied. However, as the balancing device of the invention employs a slide-block in the balancing weight, the value of me must be considered as the resultant of the masses of the eccentric ring and slide-block.

As has been clarified from the foregoing description, the present invention makes it possible to house the balancing device in a conventional type frame structure and also to keep a balance of the press in more perfect condition as compared with prior art devices because the unbalance of the press is eliminated through the vertical movement of the balancing weight attached to an end of the crank shaft and 180° out of phase with the eccentric portion of the crank shaft.

Furthermore, as the balancing weight under the present invention is slidably supported by the slide-block and strictly balanced by the air cylinder, a slide friction loss which is apt to be produced by sideward swings of the balancing weight is extremely minimized and a smooth vertical-movement of the balancing weight is ensured. Moreover, as the balancing device under the present invention is of simple structure, it is unnecessary to provide any special reinforcement for the frame structure, and a press balance can be ensured more simply and inexpensively than conventional balancing devices.

We claim:

1. In a press having a support frame, a crankshaft rotatably mounted in the frame, an eccentric portion on the crankshaft, a slide supported on the support frame for reciprocating movement with respect to the support frame, a connecting rod slidably mounted at one end thereof on the eccentric portion of the crankshaft and attached at the other end to the slide so that rotation of the crankshaft reciprocates the slide, and a counterbalancing weight driven by the crankshaft, the improvement comprising:
   a balancing weight drive portion on the crankshaft axially spaced from the eccentric portion and having a central axis of rotation coaxial with the axis of rotation of the crankshaft;
   a balancing weight supported on the support frame for reciprocating movement with respect to the support frame for counterbalancing the reciprocating movement of the slide; and
   a balancing weight drive means operatively connecting said balancing weight to said balancing weight drive portion on the crankshaft for reciprocating said balancing weight by rotation of the crankshaft in counterbalancing relationship with respect to the slide.

2. The improvement as claimed in claim 1, wherein said balancing weight drive means comprises:
   a window opening in said balancing weight;
   a slide-block slidably mounted in said window opening; and
   an eccentric drive ring rotatably mounted in said slide-block and fixedly attached to said balancing weight drive portion on the crankshaft eccentrically with respect to the geometric center of said drive ring.

3. The improvement as claimed in claim 2, wherein:
said slide-block reciprocates in a direction substantially at right angles to the direction of reciprocation of said balancing weight.

4. The improvement as claimed in claim 3, wherein:
said balancing weight reciprocates in a direction parallel to the direction of reciprocation of the slide.

5. The improvement as claimed in claim 1, wherein:
a major portion of said balancing weight is supported on the support frame in the same radial direction as the slide with respect to the axis of rotation of the crankshaft so that both the slide and said major portion of said balancing weight are on the same side of said crankshaft.

6. The improvement as claimed in claim 4, wherein:
a major portion of said balancing weight is supported on the support frame in the same radial direction as the slide with respect to the axis of rotation of the crankshaft so that both the slide and said major portion of said balancing weight are on the same side of said crankshaft.

7. The improvement as claimed in claim 5, wherein:
said slide and a major portion of said balancing weight are below the crankshaft and slide reciprocate in a vertical direction.

8. The improvement as claimed in claim 1, wherein:
the eccentricity of said drive ring with respect to the axis of rotation of the crankshaft is 180° out of phase with the eccentricity of the eccentric portion of the drive shaft.

9. The improvement as claimed in claim 2, wherein:
the eccentricity of said drive ring with respect to the axis of rotation of the crankshaft is 180° out of phase with the eccentricity of the eccentric portion of the drive shaft.

10. The improvement as claimed in claim 7, wherein:
the eccentricity of said drive ring with respect to the axis of rotation of the crankshaft is 180° out of phase with the eccentricity of the eccentric portion of the drive shaft.

11. The improvement as claimed in claim 1 and further comprising:
a plurality of parallel guide posts mounted on the support frame, said balancing weight being slidably supported on said guide posts.

12. The improvement as claimed in claim 10 and further comprising:
a plurality of parallel guide posts mounted on the support frame, said balancing weight being slidably support on said guide posts.

13. The improvement as claimed in claim 2 and further comprising:
air cylinder means supported on said support frame in spaced relationship and operatively connected to said balancing weight to produce balanced reciprocating movement of said balancing weight.

14. The improvement as claimed in claim 2, wherein:
said balancing weight has a first portion adjacent the crankshaft and a second portion remote from the crankshaft; and
said window opening is in said first portion.

* * * * *